3,094,936
FUEL CELL POWER SUPPLY FOR SUMP PUMPS
Edwin N. Lightfoot, Jr., Madison, Wis., assignor to A. O. Smith Corporation, Milwaukee, Wis., a corporation of New York
Filed Dec. 20, 1961, Ser. No. 160,872
7 Claims. (Cl. 103—25)

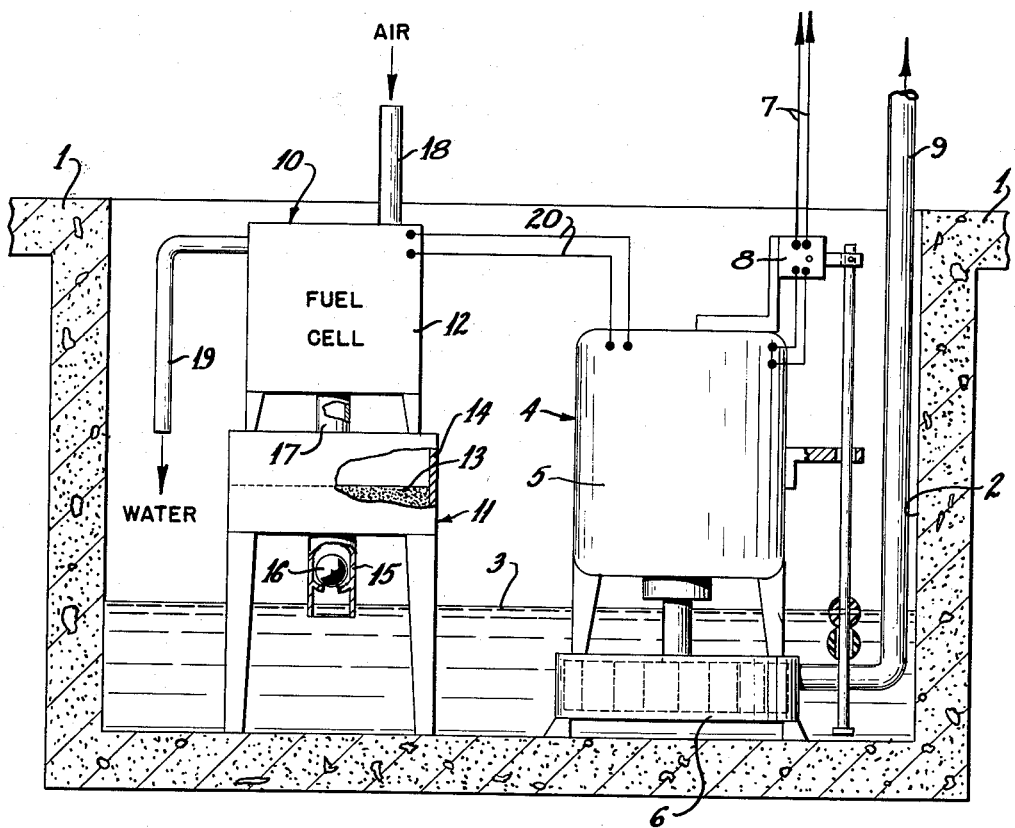

This invention relates to a fuel cell power supply for sump pumps and particularly to a power supply responsive to the level of the accumulating water or the like.

Slowly accumulating water and the like can be periodically discharged through the use of automatic sump pumps. In homes and similar structures, a well or sump is often provided in the basement floor into which water from adjacent the dwelling is carried and accumulates. A sump pump is mounted within the well or sump for the periodic discharge of the accumulated water.

Normally, the sump pump includes an electrical motor for operating a pump which withdraws and discharges the water from the sump to a suitable remote area. A water level responsive control is provided in the energizing circuit of the motor and is responsive to preselected water levels within the sump to stop and start the motor. Sump pumps operated by electric motors depend upon the availability of the usual power supply distribution system. If for any reason the main power supply fails, the sump pump is of course ineffective.

Auxiliary engine driven power supplies may be provided but the initial cost and maintenance are relatively expensive.

The present invention is directed to a combination of a sump pump and a fuel cell unit which is adapted to provide the energizing power for the motor either in normal operation of the sump pump or on a standby basis. The fuel cell unit consists of a hydrogen liberating compound which generates or forms hydrogen gas when mixed with water. Normally, the compound is maintained sealed within a suitable housing or container. A sealed opening is coupled to the accumulating water within the sump and is adapted to admit water into the sealed housing at a selected accumulation or level of the water within the sump. When the water is introduced into the container, hydrogen is immediately generated and transmitted to the fuel cell which in accordance with known phenomena produces an electrical output. The electrical output is connected to energize the sump pump and remove the water from within the sump.

The drawing furnished herewith illustrates the best mode presently contemplated for carrying out the invention.

The drawing is a diagrammatic illustration of a sump pump incorporating a fuel cell power supply constructed in accordance with the present invention.

Referring to the drawing, a fragmentary portion of a basement 1 for a dwelling or the like is illustrated having a well or sump 2 in the basement floor within which water 3 accumulates. A sump pump 4 is mounted within the sump 2 and includes an electrical direct current motor 5 connected to operate a pump section 6. The motor 5 is connected to suitable D.C. power supply lines 7 by a float operated switch unit 8. Thus, power supply lines 7 may be connected to a rectifier power unit, not shown, which is connected in the conventional power distribution system.

Under normal operation, the energizing of motor 5 is controlled by the float operated switch unit 8 which in turn is controlled by the level of the water 3 in the sump 2. At a selected accumulation of water 3, the float operated switch unit 8 closes to energize the motor 5. Energizing of the motor 5 drives the pump section 6 to discharge the water 3 through a discharge pipe 9 from pump section 6. In accordance with well-known operation, the float operated switch unit 8 maintains the electrical motor 5 energized until substantially all of the water 3 has been removed.

In accordance with the present invention, a fuel cell unit 10 is provided as an auxiliary supply to operate the motor 5 in the event the main power supply fails either through failure of the power supply at lines 7 or malfunctioning of the float operated switch 8.

The fuel cell unit 10 includes a hydrogen generating gas source 11 connected to energize a fuel cell 12 which in turn is connected to energize the motor 5.

The hydrogen generating gas source 11 includes a hydrogen liberating compound 13 disposed within a container or housing 14. The hydrogen liberating compound may be any suitable material such as lithium hydride, zinc or aluminum plus a dry salt and the like. All of such compounds chemically react with water to form hydrogen gas.

The housing 14 includes an inlet tube 15 which projects downwardly into the sump 2. A float valve 16 is incorporated in the inlet tube 15 and is gravity biased to the closed position to close the inlet tube 15. With the float 16 closing the inlet tube 15, the housing 14 is hermetically sealed and prevents entrance of water or water vapor into contact with the compound 13. If the water level in the sump 2 rises above the normal level which is selected to operate the float operated switch unit 8, the water enters the inlet tube 15 and at a selected abnormal level raises the float 16 and opens the inlet tube 15. Water therefore eventually enters the housing 14 and mixes with the hydrogen liberating compound 13 if the switch unit 8 is not operated to remove the water from the sump 2. The hydrogen liberating compound 13 rapidly reacts with the water to form hydrogen gas within the housing 14.

A transfer conduit 17 connects the housing 14 to the fuel cell 12.

The fuel cell 12 is illustrated in block diagram and may be of any conventional or suitable construction. In addition to the gas transfer conduit 17, an air inlet 18 is provided for introducing air into the fuel cell 12. The air reacts with the hydrogen gas from the source 11 to produce an electrical output.

The reaction forms water which is discharged from the fuel cell 12 through a water drain 19 provided in the fuel cell 12.

Power lines 20 connect the output of the fuel cell 12 to operate the motor 5.

In summary, the illustrated embodiment of the invention is operated as follows.

Under normal operating conditions, the float operated switch unit 8 controls energizing of the motor 5 to periodically remove water from the sump 2 in accordance with the level of the water in the sump. If for any reason the normal energizing system for the motor 5 fails, the water continues to accumulate and raises the float 16 within the inlet tube 15 eventually introducing water into the hydrogen generating gas source 11. Hydrogen gas is generated and transmitted through the conduit 17 into the fuel cell 12. The gas introduced into the fuel cell 12 reacts with air introduced through air inlet 18 to form electrical power and water. The water is discharged through the drain 19 and the electrical power is fed via lines 20 to energize the motor 5. The motor 5 is thus energized to drive the pump section 6 and discharge water from the sump 2.

As the water level drops, the float 16 falls under the influence of gravity and closes the inlet tube 15.

The amount of water introduced into the housing is selected to continue operation of the motor 5 at least until substantially all of the water has been discharged from the sump 2.

The hydrogen liberating compound 13 is periodically replaced to maintain continuous operation of the sump pump.

The present invention thus provides a new power source which may be employed as a normal power supply or as an auxiliary power supply for insuring operation of the sump pump.

Various modes of carrying out the invention are contemplated as being within the scope of the following claims particularly pointing out and distinctly claiming the subject matter which is regarded as the invention.

I claim:

1. In combination with a sump pump having an electrically operated input for pumping of an accumulating liquid, a fuel cell connected to said input and generating power in response to receipt of an operating fluid, and a source of said operating fluid connected to said fuel cell and being responsive to the accumulating liquid to introduce said fluid to said fuel cell.

2. The construction of claim 1 wherein the sump pump is adapted to be connected to a separate power source and having a float responsive switch means connected to said input and adapted to be connected to said separate power source for independently controlling the operation of the sump pump and arranged in relation to the accumulating liquid to actuate the sump pump before the accumulating liquid is responsive to actuate the fuel cell.

3. The construction of claim 1 including means for establishing communication between the fuel cell and the accumulating liquid and arranged so that the accumulating liquid constitutes the operating fluid for the fuel cell.

4. The construction of claim 3 wherein said means constitutes a passageway means having a valve urged to close the passageway and responsive to a predetermined level of the accumulating liquid to allow liquid to flow into the fuel cell.

5. In combination with a sump pump having an electrically powered motor and adapted to be disposed within a sump to intermittently discharge accumulating water from the sump within which water accumulates, a fuel cell connected to energize said motor and employing hydrogen gas as a fuel, a hermetically sealed housing having an inlet for communicating with the sump and constructed to respond to a selected accumulation of water in the sump to introduce water into the housing, a hydrogen liberating compound in said housing responsive to mixing with water to liberate hydrogen gas, and a conduit connecting said housing to said fuel cell to introduce hydrogen gas to the fuel cell.

6. The construction of claim 5 wherein said housing is supported in spaced relation to the base of the sump and includes a depending conduit means to admit accumulated water above a predetermined level into the housing, and a float responsive means independently controlling the operation of the sump pump and arranged to actuate the sump pump prior to said predetermined level.

7. The construction of claim 6 wherein a valve is provided in said conduit means, said valve being urged to close the passageway and responsive to a predetermined level of the accumulating liquid to allow the accumulating liquid to flow into the housing.

No references cited.